Dec. 6, 1927.

G. L. TULLY 1,651,488

GOGGLES

Filed July 6, 1926

Inventor

George L. Tully.

By Harry H. Styll.
Attorney

Patented Dec. 6, 1927.

1,651,488

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed July 6, 1926. Serial No. 120,773.

The present invention relates to an improved form of goggle and has particular reference to a goggle wherein the lens retaining rings are movable within but are not entirely removable from the eye cups, whereby the lenses may be interchanged with great rapidity and facility.

The primary object of the invention is to provide limiting stop means whereby the lens retaining rings are prevented from being detached and lost, thus providing a unitary structure which will permit the insertion and removal of the lenses without separating the parts of the eye cup or frame of the goggle and at the same time providing means to lock the lenses in the eye cup or frame.

A further object of the invention is to provide means whereby the lenses may be quickly inserted in and removed from the goggle frame or eye cup together with means for holding the lenses firmly in place.

A further object is to provide means whereby the lenses may be positioned within the lens rings and the said rings thereafter firmly secured within the eye cups of the goggle to lock the lenses in place.

Other objects and advantages of the invention will become apparent during the course of the following description taken in connection with the accompanying drawings, and it will be understood that I may make any modifications in the details of construction shown and described without departing from or exceeding the spirit of the invention, the preferred form of the invention only having been shown and described by way of illustration.

Referring more particularly to the drawings wherein like numerals are used to designate like parts throughout the several views.

Figure 1:
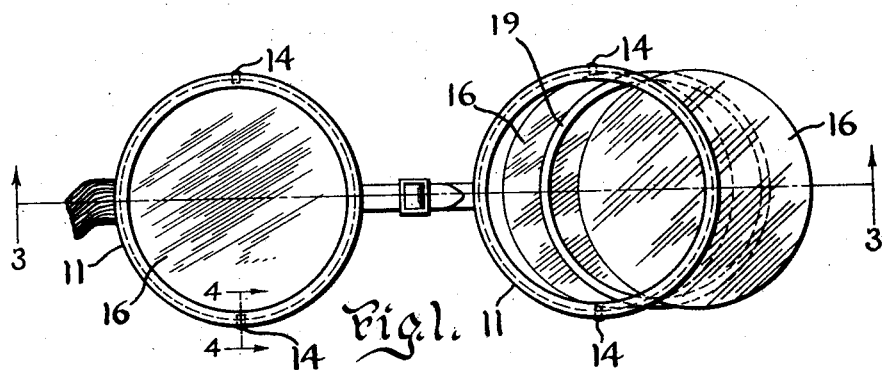
Figure 1 is a front elevation of a pair of goggles constructed according to the invention.
Figure 2:
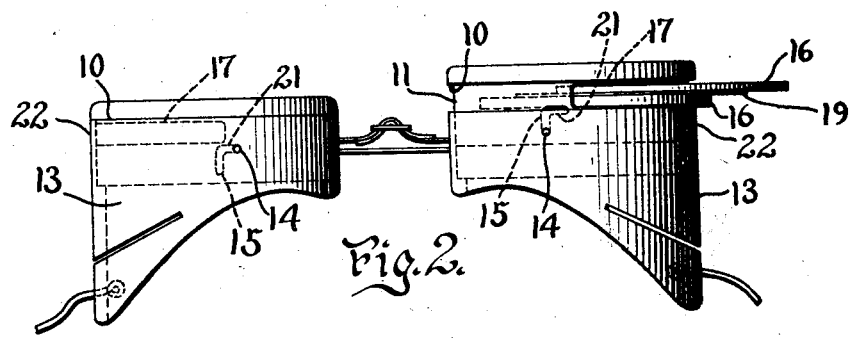
Figure 2 is a side elevation of the improved goggle.

Prior to the present invention goggles of the character shown have been constructed with removable lens rings which were threaded or the like into the eye cups so that the lenses used in the said goggles could be interchanged or replaced when broken. These particular lens rings were very unhandy in that they required an unnecessary amount of time in their removal from the goggles and were often misplaced and lost during the changing of lenses.

With the present invention, however, in which the lens rings are not removable from the goggles, there is no danger of misplacing or losing the said lens rings and the lenses may also be interchanged with great rapidity due to the simple construction of the ring attachment.

Referring more particularly to the drawings, I position the lens rings 11 within the bore or the like 12 of the eye cups 13 and attach the said rings within the eye cups by the pins or the like 14. The said pins are mounted in the side walls of the eye cups 13 and are adapted to extend within the internal bayonet slots 15 formed in the walls of the lens rings 11 so that the rings cannot be withdrawn entirely from the eye cups without taking out the pins 14 and thereby attach the said rings within the eye cups, as illustrated in Figure 3.

It will be seen that although the lens rings 11 cannot be removed from the eye cups they can be loosened by a slight turn and withdrawn from the eye cup sufficiently to allow the lens or lenses 16 to be inserted through the cut out places or slots 17 formed in the lens rings 11 and thereby positioned within the annular lens seat grooves 18 formed on the inner surface of the lens rings.

A resilient ring member or spacer 19 may be used to compensate for the variation in the thicknesses of the lenses and also to force the same to frictionally engage the side walls 20 of the lens seat grooves 18 to obviate the possible looseness and play of the said lenses within the lens rings.

Figure 3:
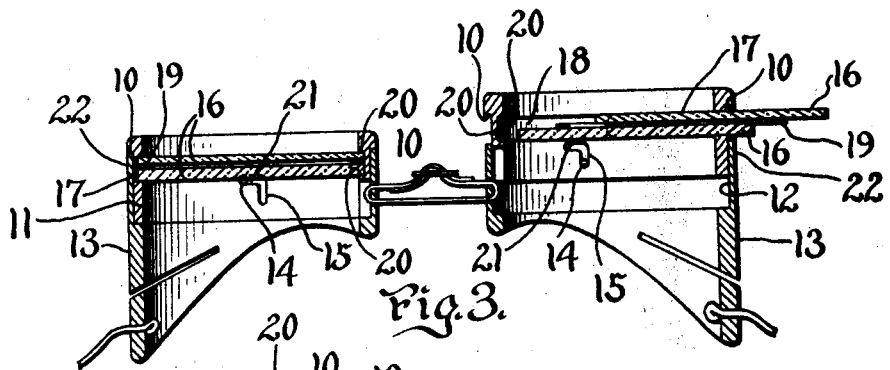
Figure 3 is a horizontal sectional view on line 3—3 of Figure 1.
Figure 4:
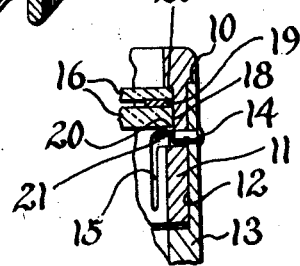
Figure 4 is an enlarged fragmentary sectional view on line 4—4 of Figure 1.

Following the positioning of the lenses within the lens grooves 18 the rings 11 are pressed inwardly until the shouldered portion 10 of the said rings engage the outer face of the eye cups 13, after which they are slightly rotated to cause the foot portion 21 of the bayonets slots 15 to engage the pins 14 positioned therein and thereby rigidly hold the lens rings 11 within the eye cups, as shown in Figure 3.

It will also be seen that when the lens rings 11 are in their fixed positions within the eye cups 13 of the goggles the slots 17 through which the lenses 16 have been inserted are completely sealed by the walls 22 of the said eye cups, thereby securing the lenses against displacement within the goggles.

To remove the lenses the rings 11 are rotated as aforementioned, which thereby disengages the foot portions 21 from the pins 14 and allows the rings to be withdrawn from the eye cups a predetermined amount, after which the lenses may be slipped outwardly through the slots 17 as illustrated in the drawings. These particular eye cups and lens rings may be made of any suitable material, such as aluminum, fiber, hardened rubber, etc., and are connected by the strap or the like 23 to form the bridge portion of the goggle.

From the foregoing description it will be seen that I have provided simple, durable and efficient means for quickly interchanging lenses and for securing the said lenses within the goggle, and in which the lens retaining rings are insured against possible loss or misplacement as afore stated.

Having described my invention, I claim:

1. In a device of the character described, an annular eye cup, an annular ring telescopingly fitted in the eye cup and having a peripheral slot of extent sufficient to admit a lens and also having a second peripheral slot having a longitudinal and a transverse section, and a projection on the eye cup extending into the second slot in the ring whereby the ring is locked in the eye cup when the projection is in the transverse section of the slot and may have longitudinal movement therein when the projection is in the longitudinal section of the slot.

2. In a device of the character described, an annular eye cup, an annular lens seat ring telescopingly fitted in the eye cup and having a peripheral slot of extent to admit a lens and locking means interacting between the ring and the eye cup that will permit of the extension of the ring beyond the end of the eye cup so as to expose the slot and admit the lens, and will lock the ring against longitudinal movement when the ring is telescoped within the eye cup so that the walls of the eye cup will cover the slot.

3. In a device of the character described, an annular eye cup, an annular lens seat ring telescopingly and rotatively fitted in the eye cup and having a peripheral slot of extent sufficient to admit a lens and interacting means between the eye cup and the ring to permit telescoping movement of the ring to bring the slot beyond the end of the eye cup to admit the lens and to recede within the eye cup to bring the slot within the ends of the eye cup and to permit of rotative movement of the ring in the eye cup to lock the ring in the innermost position in the eye cup.

4. In a device of the character described, an annular eye cup, an annular lens seat ring telescopingly and rotatively fitted in the eye cup, and having a lens seat and a peripheral slot communicating with the lens seat of sufficient extent to admit a lens to the lens seat, and interengaging means between the eye cup and ring whereby the ring may be moved longitudinally to bring the slot beyond the end of the eye cup to admit the lens to the lens seat and then receded to bring the slot within the ends of the eye cup and the ring rotated in the innermost position to lock the ring against longitudinal movement in the eye cup.

5. In a device of the character described, an annular eye cup, an annular lens seat ring telescopingly and rotatively fitted in the eye cup and having a lens seat and a peripheral slot communicating with the lens seat of sufficient extent to admit the lens to the lens seat, and a bayonet joint connection between the eye cup and ring that will permit of the extension of the ring beyond the ends of the eye cup to admit the lens and that will lock the ring in the eye cup when the ring is receded into the eye cup to bring the slot below the ends of the eye cup.

6. In a device of the character described, an eye cup, a lens seat ring telescopingly fitted in the eye cup and having a lens seat and a peripheral slot communicating with the lens seat whereby a lens may be admitted to the lens seat, interengaging means between the ring and eye cup whereby the lens ring may be withdrawn from the eye cup to a limited amount to expose the slot for admission of the lens, and whereby the ring may be receded within the eye cup to cover the slot, and means to lock the ring in the eye cup in the receded position.

GEORGE L. TULLY.